L. W. & A. M. RIGGS.
ROTARY INTERNAL COMBUSTION ENGINE.
APPLICATION FILED MAY 2, 1916.

1,225,056.

Patented May 8, 1917.
4 SHEETS—SHEET 1.

INVENTORS
Lewis W. Riggs
Ashley M. Riggs
BY
ATTORNEY

L. W. & A. M. RIGGS.
ROTARY INTERNAL COMBUSTION ENGINE.
APPLICATION FILED MAY 2, 1916.

1,225,056.

Patented May 8, 1917.

INVENTORS
Lewis W. Riggs
Ashley M. Riggs

BY
ATTORNEY

UNITED STATES PATENT OFFICE.

LEWIS W. RIGGS AND ASHLEY M. RIGGS, OF WHEELING, WEST VIRGINIA.

ROTARY INTERNAL-COMBUSTION ENGINE.

1,225,056.   Specification of Letters Patent.   Patented May 8, 1917.

Application filed May 2, 1916. Serial No. 94,877.

*To all whom it may concern:*

Be it known that we, LEWIS W. RIGGS and ASHLEY M. RIGGS, citizens of the United States of America, and residents of Wheeling, county of Ohio, and State of West Virginia, have invented certain new and useful Improvements in Rotary Internal-Combustion Engines, of which the following is a specification.
This invention relates to a rotary internal combustion engine.

The primary object of the invention is to provide an internal combustion engine of a rotary type in which the employment of the usual cam shaft, valves and gears is wholly dispensed with and in which the power impulses are delivered in such manner as to balance or equalize the side thrusts or strains imposed upon the engine shaft and bearings, resulting in the practical elimination of vibration.

A further object is to provide a motor of the character mentioned in which a plurality of power explosions occur in each revolution of the piston, producing such an overlap of power impulses as contributes to the highest efficiency.

A still further object is to provide a motor of unit type which is adapted to be employed either singly or in association with any desired number of similar connected units, according to the power requirements presented.

A still further object within the contemplation of this invention is to provide a motor composed of a minimum number of parts liable to become out of order and in which all parts are readily accessible.

With these and other important objects in view, the invention resides in the features of construction, arrangement of parts and combinations of elements which will hereinafter be exemplified, reference being had to the accompanying drawings, in which—

Referring to said drawings, in which like designating characters distinguish like parts throughout the several views—

1 indicates the walls or casing of a cylinder which may be employed alone or in association with one or more similar cylinders. Two cylinders disposed in alined relation are herein illustrated, and the description herein given will therefore be directed specifically to a two-cylinder engine; but it will be understood, as above indicated, that each individual cylinder constitutes a unit which may be used singly or in association with any number of similar units.

Figure 11:
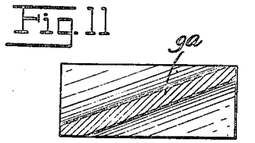
Fig. 11 is an enlarged cross section of a fan-like blade or spoke.

Bolted to the opposite ends of the cylinder casing 1 when a single cylinder is employed is a cylinder head 2, or, when two cylinders are employed, a cylinder head 2 is bolted to the outer end of each cylinder. A cylinder head or plate 3 is employed between two adjacent casings 1, said head being common to said cylinders. Said heads 2 have central openings 4 therethrough, said openings being preferably of the largest permissible size, as will hereinafter be explained. Substantially radial spider-like arms or spokes 5 join the bodies of said cylinder heads to hub-bearings 6 in which an axially disposed engine shaft 7 is rotatable. Keyed upon said shaft within the cylinder and adjacent to each of the cylinder heads 2 and 3 is the hub 8 of a circular plate 9 which constitutes the end wall of a rotary piston, said end walls being attached to the opposite ends of a piston body 10, as by means of bolts 11. The bodies of said end walls are joined to their hubs by radial spoke-like blades 9ª which have a laterally inclined disposition, as shown in Fig. 11, adapting them to serve in the capacity of fan blades for creating a forced draft of air through the interior of the engine for cooling the latter.

The piston body 10 is preferably composed of a one-piece skeleton-like casting having a generally circular periphery and having a plurality of external longitudinally disposed pockets 12 extending throughout its length. The peripheral edges of the end walls 9 of the piston closely approach the walls of the cylinder casing 1 and have flexible expansion rings 13 seated therein for preventing leakage between said end walls and said casing.

While any desired number of pockets 12 may be provided in the piston body 10, I prefer to employ four of such pockets located at equidistant intervals. Said pockets are substantially triangular in form, as is most clearly shown in Fig. 1. Mounted in each pocket so that its ends are disposed close against the opposite end walls 9 of the piston is a compression head 14 which is approximately triangular in cross section. Said head has a regularly curved or rounded rear edge which is disposed within a correspondingly shaped edge of the pocket 12 and is pivoted upon a longitudinally disposed pin or rod 15 having its opposite ends mounted in the oppositely disposed end walls 9. The forward or front edge of the compression head is of materially less thickness than the depth of the corresponding edge, or deepest portion, of the pocket 12, said head being thus adapted for oscillation in a substantially radial direction, swinging on its pivot pin 15. The outer face of said compression head has a curvature corresponding to that of the wall 1 of the cylinder while the inner face thereof is shaped to conform to the surface of the piston body 10 located at the bottom of the pocket 12, thus adapting said head for seating firmly at both of the extreme limits of its oscillatory movement. The front edge wall 16 of said compression head is curved, the curve thereof being struck on a radius having the center of the pivot pin 15 as its center, and the lower part of the front edge wall of said pocket 12 is correspondingly curved; thus, throughout the range of the oscillatory movement of said head, the latter is disposed in close fitting relation to said front edge wall. For effectually sealing the lower part of said pocket against the passage of gases between said front edge walls, a spring-pressed strip 17 of a suitable material is mounted in a longitudinal groove 18 provided therefor in said front edge wall of the pocket. Similar strips 19 are mounted in the opposite ends of said compression head for preventing leakage between the latter and the end walls 9 of the piston.

A wrist pin 20 is carried by and projects laterally from each of the opposite ends of the compression head 14, said pins being located at suitable points adjacent to the angle between the under side and front edge wall of said head. Said pins 20 project outward through substantially radial slots 57 provided in the end-walls 9 and are received in and travel within identically arranged guide grooves 21 provided in the adjacent faces of the cylinder heads 2 and 3. Each of said grooves is endless and describes an irregular course which is so predetermined that each compression head is actuated, through its wrist pins 20, to move to and from its limits of movement at regularly timed intervals, as will be more fully described hereinafter.

Figure 1:
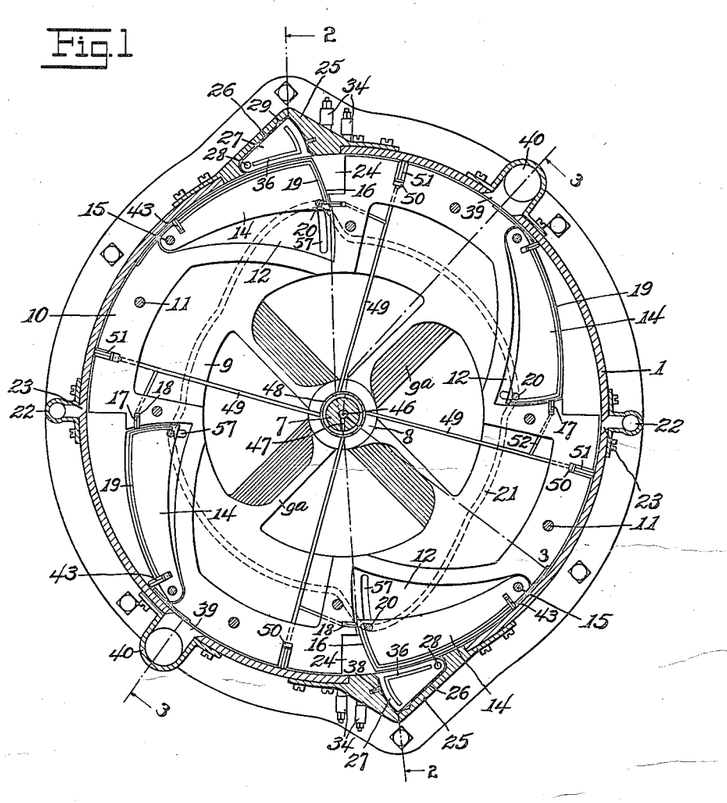
Figure 1 is a transverse sectional elevation of the invention, the section being taken at a point close inside the end wall of the piston.

Located at diametrically opposite points on the cylinder are two gas-inlet manifolds 22 communicating with inlet ports 23 through which charges of gas are admitted to the gas chambers constituted by those portions of the pockets 12 which lie between the cylinder walls 1 and the compression heads when the latter occupy their depressed or inwardly-thrust positions, as shown at the right and left hand sides of Fig. 1 wherein the parts are shown occupying the positions assumed immediately prior to the opening of said inlet ports 23 for the admission of charges to the then open chambers.

It will be noted that the piston body 10 is offset slightly at the upper forward edge of the pocket 12 to provide a longitudinal open space or chamber 24 of approximately rectangular form in front of the upper part of the front edge of the compression head 14 when the latter occupies its uppermost position. Said open space or chamber 24 constitutes a compression chamber within which the admitted gases are compressed prior to firing, as will hereinafter be explained. Said chamber 24 constitutes a part of the gas chamber when the compression head is lowered, as is clearly shown at the right and left hand sides of Fig. 1. At the instant that the rotating piston begins to uncover the inlet ports 23, the approaching compression heads begin a slight inward movement, being actuated by the entrance at the moment of the wrist pins 20 of said heads in an inward inclined portion of the guide grooves 21. This inward movement of the compression head produces a suction which facilitates to some extent the entrance of the charge. Having moved to the limit of its inward or depressed movement, the compression head is retained in said position until its rear end has passed said inlet port, whereupon said head begins to rise gradually until, at a point somewhat less than 90 degrees distant from the port 23 it seats against the cylinder wall, as shown at the upper and lower sides of Fig. 1. In its said rising movement, the admitted gas has thereby been compressed into the compression chamber 24 which, as is apparent, is of restricted capacity.

Figure 5:
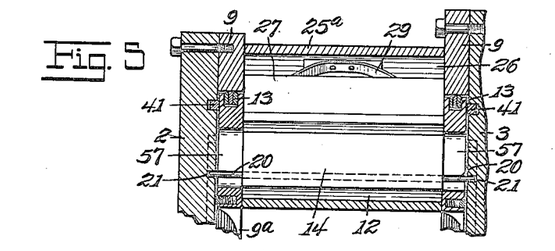
Fig. 5 is a section on line 5—5, Fig. 4.
Figure 6:
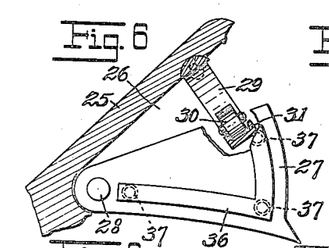
Fig. 6 is an enlarged detail view of the resistance head and its depressing means, showing the former partly in end elevation and the latter in section.
Figure 7:
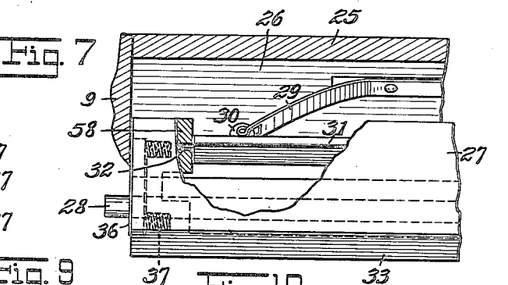
Fig. 7 is an enlarged front elevation of the same, a portion of the front edge wall of the resistance head being broken away.

Detachably mounted on the cylinder walls at diametrically opposite points are longitudinally disposed rib-like metal inserts 25 the inner walls or faces of which are coincident with said cylinder walls, as shown in Fig. 1. Provided in each of said inserts is a pocket 26 of substantially triangular form the inner side of which opens directly into the interior of the cylinder. Closely fitted in said pocket is a correspondingly shaped and dimensioned follower or resistance head 27 which has trunnions 28 on its rear edge pivoted in the opposite end walls 9 of the piston and which is adapted to swing on said trunnions into and out of its said pocket 26. One or more suitable compression springs, as 29, are mounted to bear upon said resistance head whereby the latter is normally held in an inwardly thrust position. While various forms of springs may be employed for the purpose, it is preferred to employ the bow-shaped spring 29 shown in Figs. 5, 6 and 7, the same being attached intermediate its ends to the insert 25 and having anti-friction rollers 30 at its ends disposed in bearing relation to a trough-like member 31 which has trunnions 32 loosely received in bearings 58 provided therefor at or adjacent the ends of said resistance head. To afford space for said parts, the resistance head is cored out, or made hollow, as shown.

Figure 4:
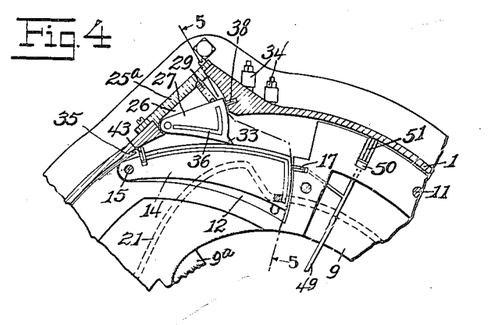
Fig. 4 is a detail sectional elevation similar to that shown at the upper part of Fig. 1, the same showing a slight structural modification and illustrating the parts occupying substantially the positions assumed at the explosion point.

The location of the resistance heads, is such that the latter are maintained outwardly thrust in their pocketed positions against the tension of the springs 29, first, by the peripheral walls of the piston body 10, and then by the outwardly thrust compression heads until the charge of gas has been compressed, as aforesaid. Slightly prior to reaching the point at which the gas shall be exploded, the compression head is actuated to rapidly move inward from the position shown at the upper and lower sides of Fig. 1 to that shown in Fig. 4, a sharp inclination of the guide groove 21 being provided at the appropriate point for producing such movement. Actuated by the spring 29, the resistance head follows the inward movement of the compression head, a forwardly projecting angular rib 33 formed on the lower front edge of said resistance head resting upon the outer face of the compression head, as shown in Fig. 4, for preventing the rearward escape of the compressed gases. When the parts have assumed substantially the position shown in the last-mentioned figure, wherein the outer face of the compression head is substantially coincident with the lower wall of the offset formed to provide the compression chamber 24, the charge is exploded through the intermediacy of one or more appropriately located spark plugs 34. The impact of the explosion is thus received by the resistance head carried by the fixed cylinder and by the radially disposed piston wall which defines the front edge of the compression chamber, and, being rotatable, the piston is violently impelled forward.

It will be noted that, following the explosion, the capacity of the chamber increases with the advance of the piston, giving effect to the expansion of the exploded gases, until the resistance head has been wholly returned to its pocketed position, said return being actuated gradually with the approach of the rear edge of the compression head.

Figure 12:
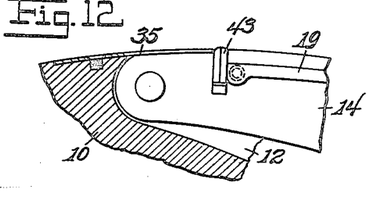
Fig. 12 is an enlarged detail section showing the buffer-like spring carried by the piston body for yieldingly engaging the lowered resistance head in advance of the piston wall; and—

For preventing the slap or knock which would otherwise be incident to the engagement with the resistance head of the peripheral wall of the piston body directly behind the pocket 12, a substantially flat spring 35 is mounted upon said wall to partially overlie the rear edge of said pocket, as is most clearly shown in Fig. 12, said spring being adapted to yieldingly engage said resistance head and to ease the same upward in advance of the engagement of said wall with said head.

Sealing strips 36 of suitable material are mounted in the opposite ends of the resistance heads for engaging the adjacent end walls 9 of the piston to prevent the leakage of gas between said parts, suitable springs, as 37, underlying said strips for holding the latter thrust outward under yielding tension. A longitudinal sealing strip 38 is in like manner mounted in the front edge wall defining the pocket 26 in a position to yieldingly engage the front edge of the resistance head.

Located in the cylinder walls 1 at points an appropriate distance in advance of each of the explosion points is an exhaust port 39 communicating with an exhaust manifold 40 through which the spent gases are expelled with the advance of the piston, preparing the gas chamber for receiving a fresh charge when the inlet port 23 opposide that at which the first-mentioned charge was taken is reached.

It will be understood that the explosions occur simultaneously at diametrically opposite points in the cylinder, thus equalizing or balancing the strains and overcoming the side thrust on the engine shaft and the bearings which would be incident to non-simultaneous explosions. Further, two explosions occur in each gas chamber in each revolution of the piston, and, therefore, with a piston having four gas chambers, as in that depicted, eight explosions occur in each revolution, thus producing a rapid succession of impulses which contributes to high efficiency.

To further effectually seal the relatively moving parts against the escape of gases, suitable gasket-like sealing strips and rings may be provided at appropriate points, as, for instance, circular strips or rings 41 are mounted in grooves 42 provided therefor in the cylinder heads 2 and 3 to yieldingly bear against the piston end-walls 9, and longitudinal strips 43 in the upper faces of the compression heads adjacent to the pivoted ends of the latter and adapted to bear against the cylinder walls.

Lubrication for the moving parts may be furnished in any appropriate manner, but preferably in the manner shown, in which a lubricant feeds from a primary reservoir 44 to a duct 45 leading to a passage 46 which extends longitudinally through the engine shaft. Ducts 47 lead outward from said passage to auxiliary reservoirs 48 of cylindrical form which encircle and are fixed on the shaft between the end walls 9 of the pistons. From each of said auxiliary reservoirs 48 a plurality of feed pipes 49 radiate to appropriate points, as to longitudinal grooves or channels 50 provided at suitable points in the periphery of the piston body 10. Spring-pressed strips 51 are disposed in said grooves and project therefrom into yielding engagement with the cylinder walls. Branch pipes, as 52, lead to various other points, as to ducts 53 in the end-walls 9 of the piston, which ducts lead to the grooves in which the peripheral expansion rings 13 are located.

Figure 8:
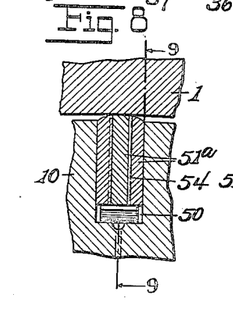
Fig. 8 is an enlarged sectional detail view showing a longitudinal spring-pressed sealing and lubricating strip carried on the peripheral face of the piston body.
Figure 9:
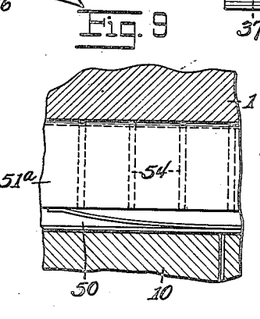
Fig. 9 is a section on the line 9—9, Fig. 8.
Figure 10:
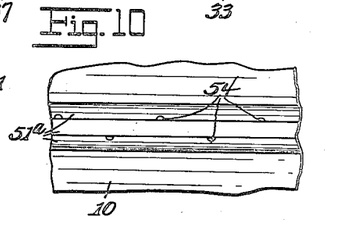
Fig. 10 is an outer face view of said strip.

Each of the various sealing rings and strips is preferably composed of a plurality of close-fitting leaf-like members, as shown in Figs. 8, 9 and 10, wherein the strip 51 is illustrated as composed of a plurality of members 51ª. Groove-like ducts 54 provided in adjacent faces of said members afford passage for the lubricant between the groove or channel 50 and the wearing surfaces.

The bearings 6 are lubricated in any appropriate manner, as through ducts 55 leading from suitably located grease-cups 56.

Figures 2, 13:
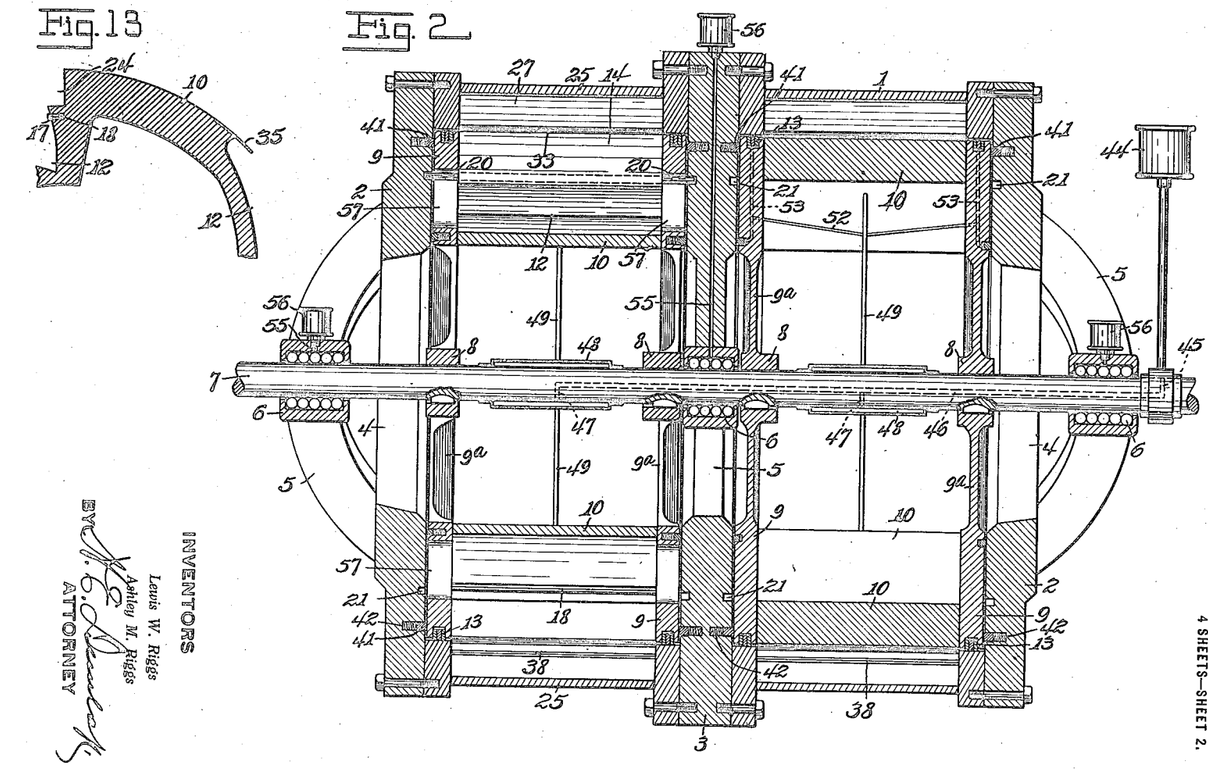
Fig. 2 is a longitudinal section of a two-cylinder engine constructed in accordance with the invention, the section being taken on the line 2—2, Fig. 1.
Fig. 13 is a partial central transverse section of the piston body. 85
Figure 3:
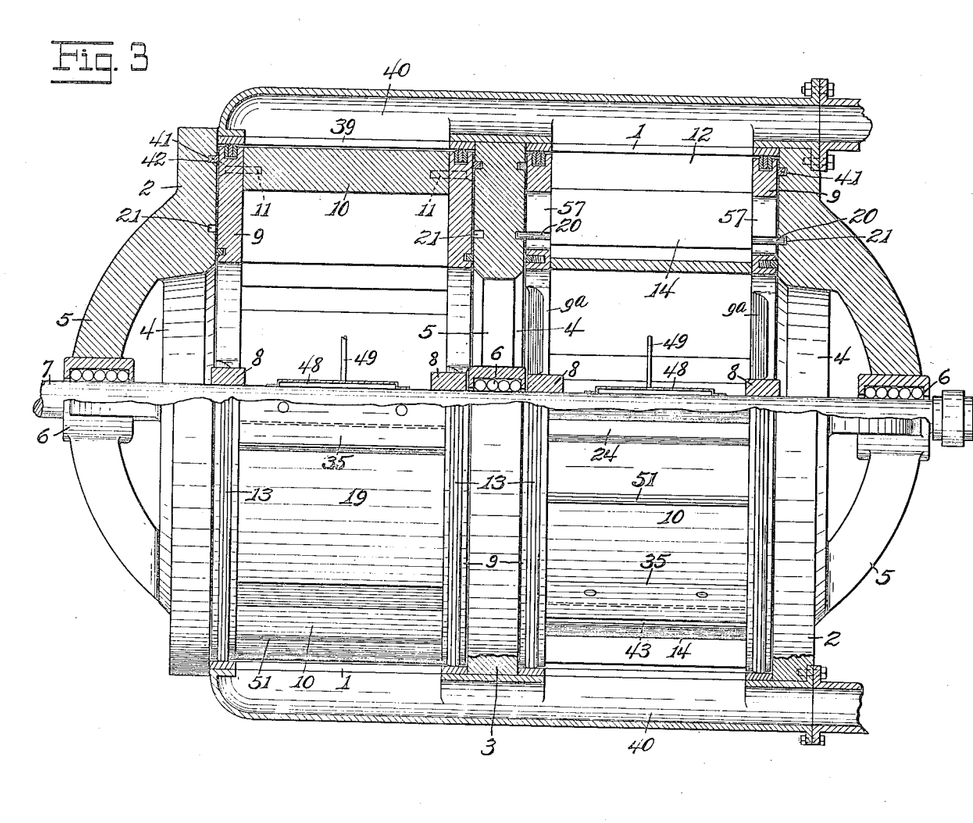
Fig. 3 is a view partly in longitudinal section and partly in sectional elevation, said section being taken on line 3—3, Fig. 1.

When two or more cylinders are employed, the pistons thereof are positioned in offset relation to each other, as is shown in Fig. 2, the extent of the offset being dependent upon the number of cylinders employed in the engine. As is obvious, when the engine is composed of two cylinders, the pistons thereof are off-set at an angle of 45 degrees, whereas, when composed of three cylinders, the pistons are offset at an angle of 30 degrees, and so on.

In Fig. 4 is illustrated a modified construction wherein the wall defining the front edge of the pocket 26 is an integral part of the cylinder casing 1 and wherein a modified form of insert 25ª is used.

While a practical embodiment of the invention is herein shown and described, it will be understood that the invention is not limited to a strict conformity with the showing of the drawings, but may be changed and modified to the extent that such changes and modifications shall work no material departure from the salient features of the invention.

What is claimed is—

1. In an internal combustion engine, a cylinder, an axially disposed shaft, a rotary piston fixed on said shaft within said cylinder and having a plurality of pockets in its periphery, said piston being also provided with an offset peripheral recess in front of and opening into the outer portion of each pocket; compression heads mounted within said pockets and adapted to oscillate with respect to the cylinder walls, and means whereby said heads are actuated at definite intervals in the rotation of the piston.

2. In an internal combustion engine, a cylinder, an axially disposed shaft, a rotary piston of substantially cylindrical form fixed on said shaft within said cylinder, said piston having a plurality of pockets located at regularly spaced intervals in its periphery, compression heads mounted within said pockets, and operable into and out of close-fitting relation to the cylinder walls, movable resistance heads coöperating with said compression heads, and means whereby said compression heads are actuated to oscillate with respect to the cylinder walls at definite intervals in the rotation of said piston.

3. In an internal combustion engine, a cylinder, an axially disposed shaft, a rotary piston of substantially cylindrical form fixed on said shaft within said cylinder, said piston having a plurality of pockets located at regularly spaced intervals in its periphery, compression heads pivotally mounted in said pockets and adapted to swing toward and away from the cylinder walls, movable resistance heads disposed in coöperative relation to said compression heads, and means for actuating said compression heads at definite intervals in the rotation of said piston.

4. In an internal combustion engine, a cylinder, an axially disposed shaft, a rotary piston of substantially cylindrical form fixed on said shaft within said cylinder, said piston having a plurality of longitudinally disposed pockets located at regularly spaced intervals in its periphery, said pockets being of substantially triangular form in cross section, compression heads pivotally mounted within said pockets, movable resistance heads disposed in coöperative relation to said compression heads, and means for actuating said compression heads to swing toward and away from the cylinder walls at definite intervals in the rotation of said piston.

5. In an internal combustion engine, a cylinder, an axially disposed shaft, a rotary piston of substantially cylindrical form fixed on said shaft within said cylinder, said piston having a plurality of longitudinally disposed pockets located at regularly spaced intervals in its periphery, said pockets being of substantially triangular form in cross section, compression heads pivotally mounted within said pockets and operable to and from close-fitting relation to the cylinder walls, movable resistance heads disposed in coöperative relation to said compression heads, and means for actuating said compression heads to describe predetermined movements at definite points in the rotation of the piston.

6. In an internal combustion engine, a cylinder having suitably located gas inlet ports in its walls, an axially disposed shaft, a rotary piston of substantially cylindrical form fixed on said shaft within said cylinder, said piston having a plurality of pockets located at equidistant intervals in its periphery, compression heads pivoted within said pockets and operable in substantially radial directions into and out of close-fitting relation to the cylinder walls, means for actuating said heads to oscillate at definite intervals in the rotation of the piston, resistance heads disposed in coöperative relation to said compression heads, and means for actuating said resistance heads.

7. In an internal combustion engine, a cylinder having suitably located gas inlet ports in its walls, an axially disposed shaft, a rotary piston of substantially cylindrical form fixed on said shaft within said cylinder, said piston having a plurality of pockets located at equidistant intervals in its periphery, compression heads pivoted within said pockets and operable in substantially radial directions into and out of close-fitting relation to the cylinder walls, means for actuating said heads to effect a plurality of complete oscillations in each rotation of the piston, a resistance head disposed in coöperative relation to each compression head, and means for actuating each resistance head.

8. In an internal combustion engine, a cylinder having suitably located gas inlet ports in its walls, an axially disposed shaft, a rotary piston of substantially cylindrical form fixed on said shaft within said cylinder, said piston having a plurality of pockets located at equidistant intervals in its periphery, compression heads pivoted within said pockets and operable in substantially radial directions into and out of close-fitting relation to the cylinder walls, movable resistance heads disposed in coöperative relation to said compression heads, the portions of said pockets intermediate said compression heads and the cylinder walls constituting gas chambers for receiving gas admitted through said inlet ports, means for actuating each compression head to move outward to compress the admitted gas into a portion of the pocket having a restricted capacity, means for exploding the compressed gas, and means for exhausting the exploded gases.

9. In an internal combustion engine, a cylinder having suitably located gas inlet ports in its walls, an axially disposed shaft, a rotary piston of substantially cylindrical form fixed on said shaft within said cylinder, said piston having a plurality of pockets located at equidistant intervals in its periphery, compression heads pivoted within said pockets and operable in substantially radial directions into and out of close-fitting relation to the cylinder walls, means for actuating said heads to oscillate at definite intervals in the rotation of the piston for admitting and compressing charges of gas, resistance heads carried by said cylinder and located outside the path of said piston, said resistance heads being adapted to follow the inward movements of said compression heads subsequent to the compressing movements of the latter and prior to exploding the admitted charges, and means for exhausting the exploded gases.

10. In an internal combustion engine, a cylinder having a pair of diametrically opposite gas inlet ports and a pair of diametrically opposite exhaust ports in the walls thereof, an axially disposed shaft, a substantially cylindrical rotary piston fixed on said shaft within said cylinder, said piston having a plurality of diametrically opposite pockets in its periphery, a compression head mounted in each pocket and adapted to oscillate with respect to the cylinder walls, means for imparting definite movements to said heads at definite points in the rotation of the piston, said movements being such that gas is drawn into said pockets as the latter are brought into register with said inlet ports and is compressed by said heads subsequent to the intake thereof, said movement-imparting means actuating said heads to move inward after the compression of gas has been effected, means carried by the cylinder for following said heads in the last-mentioned movement for maintaining the compression and constituting resistance heads, and means for simultaneously exploding the compressed gases in diametrically opposite pockets.

11. In an internal combustion engine, a cylinder having a pair of diametrically opposite gas inlet ports and a pair of diametrically opposite exhaust ports in the walls thereof, an axially disposed shaft, a substantially cylindrical rotary piston fixed on said shaft within said cylinder, said piston having a plurality of diametrically opposite pockets in its periphery, a compression head mounted in each pocket and adapted to oscillate with respect to the cylinder walls, means for imparting definite movements to said heads at definite points in the rotation of the piston, said movements being such that gas is drawn into said pockets as the latter are brought into register with said inlet ports and is compressed by said heads subsequent to the intake thereof, said movement-imparting means actuating said heads to move inward after the compression of gas has been effected, a pair of resistance heads pivotally mounted on the cylinder at diametrically opposite points and adapted to move into said pockets as permitted by said compression heads for confining compressed gases and to afford resistance to explosions of said gases, and means for simultaneously exploding the compressed gases when said heads have assumed lowered positions.

12. In an internal combustion engine, a cylinder having ring-like heads provided with spokes and hub-bearings, an axially disposed shaft journaled in said bearings, a substantially cylindrical hollow piston rotatable within said cylinder, said piston having end walls provided with spokes of inclined fan-like blade form whereby a forced draft is created through the interior thereof, hubs carried by said spokes and keyed upon said shaft, said piston having a plurality of pockets in its periphery, compression heads mounted in said pockets and adapted to oscillate with respect to the cylinder walls, means whereby said heads are actuated at definite intervals in the rotation of the piston, and means carried by the cylinder for following the inward movements of said heads for maintaining compression and constituting resistance heads.

13. An internal combustion engine comprising a cylinder having a pair of diametrically opposite gas intake ports in its walls, a shaft extended axially through and rotatable with respect to said cylinder, a substantially cylindrical piston fixed on said shaft and rotatable within said cylinder, said piston having in its periphery four longitudinally extending gas-receiving pockets of approximately triangular form in cross section, said pockets being located at equidistant intervals, a member of approximately triangular form in cross section pivotally mounted in each pocket and adapted for movement in a substantially radial direction, said member being of materially less cross sectional area than said pocket and adapted to conformably seat against the cylinder walls when it occupies the limit of its outward movement, said piston being provided with an offset peripheral recess in front of and opening into the outer portion of said pocket, said recess constituting a chamber into which gas admitted to the pocket through an intake port is compressed by outward movement of said member, means for imparting definite movements to said member at definite points in the rotation of the piston, and gas-exploding means leading through the cylinder walls at diametrically opposite points.

14. An internal combustion engine comprising a cylinder having a pair of diametrically opposite gas intake ports in its walls, a shaft extended axially through and rotatable with respect to said cylinder, a substantially cylindrical piston fixed on said shaft and rotatable within said cylinder, said piston having in its periphery four longitudinally extending gas-receiving pockets of approximately triangular form in cross section, said pockets being located at equidistant intervals, a member of approximately triangular form in cross section pivotally mounted in each pocket and adapted for movement in a substantially radial direction, said member being of materially less cross sectional area than said pocket and adapted to conformably seat against the cylinder walls when it occupies the limit of its outward movement, said piston being provided with an offset peripheral recess in front of and opening into the outer portion of said pocket, said recess constituting a chamber into which gas admitted to the pocket through an intake port is compressed by outward movement of said member, means for imparting definite movements to said member at definite points in the rotation of the piston, gas-exploding means leading through the cylinder walls at diametrically opposite points, pockets formed in the cylinder walls at diametrically opposite points adjacent to said gas-exploding means, and elements disposed in the last-mentioned pockets and adapted to seat upon and follow the movements of said members as the latter pass thereunder, said elements occupying inwardly thrust positions for presenting substantial surface areas to the impacts of the explosions when the piston assumes firing position.

15. An internal combustion engine comprising a cylinder having a pair of diametrically opposite gas intake ports in its walls, a shaft extended axially through and rotatable with respect to said cylinder, a substantially cylindrical piston fixed on said shaft and rotatable within said cylinder, said piston having in its periphery four longitudinally extending gas-receiving pockets of approximately triangular form in cross section, said pockets being located at equidistant intervals, a member of approximately triangular form in cross section pivotally mounted in each pocket and adapted for movement in a substantially radial direction, said member being of materially less cross sectional area than said pocket and adapted to conformably seat against the cylinder walls when it occupies the limit of its outward movement, said piston being provided with an offset peripheral recess in front of and opening into the outer portion of said pocket, said recess constituting a chamber into which gas admitted to the pocket through an intake port is compressed by outward movement of said member, means for imparting definite movements to said member at definite points in the rotation of the piston, gas-exploding means leading through the cylinder walls at diametrically opposite points, pockets formed in the cylinder walls at diametrically opposite points adjacent to said gas-exploding means, and elements disposed in the last-mentioned pockets, said elements being pivotally mounted and adapted to swing for seating upon and for following the movements of said members as the latter pass thereunder, said elements occupying inwardly swung positions when the firing positions are assumed by the piston.

In testimony whereof we affix our signatures in presence of two witnesses.

LEWIS W. RIGGS.
ASHLEY M. RIGGS.

Witnesses:
H. E. DUNLAP,
W. F. KEEFER.